United States Patent [19]

Guggenheim et al.

[11] Patent Number: 5,006,637

[45] Date of Patent: Apr. 9, 1991

[54] METHOD FOR PREPARING COPOLYESTERCARBONATES FROM CYCLIC OLIGOMERS

[75] Inventors: Thomas L. Guggenheim, Scotia; James M. Fukuyama, Clifton Park; John J. Kelly, Troy, all of N.Y.

[73] Assignee: General Electric Company, Schenectady, N.Y.

[21] Appl. No.: 364,387

[22] Filed: Jun. 12, 1989

[51] Int. Cl.$^5$ .............................................. C08G 63/64
[52] U.S. Cl. .................................. 528/355; 528/354; 528/356; 528/357; 528/358; 528/370; 528/371
[58] Field of Search ............... 528/355, 357, 354, 356, 528/358, 371, 370

[56] References Cited

U.S. PATENT DOCUMENTS 4,740,583  4/1988  Brunelle et al. .................. 528/370
4,757,132  7/1988  Brunelle et al. .................. 528/357

*Primary Examiner*—Harold D. Anderson
*Attorney, Agent, or Firm*—William H. Pittman; James C. Davis, Jr.

[57] ABSTRACT

Copolyestercarbonates are prepared by the reaction of at least one cyclic polycarbonate oligomer with at least one cyclic polyester oligomer in the presence of a cyclic polycarbonate polymerization catalyst at temperatures in the range of about 280°–375° C. Mixtures of bisphenol A polycarbonate and bisphenol A isophthalate or terephthalate oligomers are preferably employed, and the preferred catalysts are tetraarylborate salts such as tetra-n-butylammonium tetraphenylborate.

17 Claims, No Drawings

METHOD FOR PREPARING COPOLYESTERCARBONATES FROM CYCLIC OLIGOMERS

This invention relates to the preparation of copolyestercarbonates, and more particularly to their preparation from cyclic intermediates.

Various copolyestercarbonates are known in the art. They are frequently of value in that they combine beneficial properties of polycarbonates and polyesters. Methods for preparing copolyestercarbonates include the interfacial reaction of a bisphenol with phosgene and a dicarboxylic acid chloride, in the presence of a base and a hydrogen chloride scavenger and in a mixed aqueous-organic liquid reaction medium.

It has now been discovered that cyclic polycarbonate and polyester intermediates can be employed for the preparation of copolyestercarbonates. Accordingly, the present invention is a method for preparing a copolyestercarbonate which comprises contacting at least one cyclic polycarbonate oligomer with at least one cyclic polyester oligomer in the presence of a cyclic polycarbonate polymerization catalyst, at a temperature in the range of about 280°–375° C.

Cyclic polycarbonate oligomers used in the method of this invention are a known class of compounds, disclosed in many patents and other publications. Reference is made, for example, to U.S. Pat. No. 4,740,583, the disclosure of which is incorporated by reference herein.

The cyclic polycarbonate oligomers are macrocyclic compounds typically having structural units represented by the formula

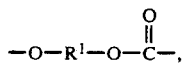  (I)

wherein $R^1$ is a divalent aromatic radical and most often a hydrocarbon radical. The $R^1$ radical preferably has the formula $$-A^1-Y-A^2-, \quad (II)$$

wherein each of $A^1$ and $A^2$ is a monocyclic divalent aromatic radical and Y is a bridging radical in which one or two atoms separate $A^1$ from $A^2$. The free valence bonds in formula II are usually in the meta or para position of $A^1$ and $A^2$ is relation to Y.

In formula II, the $A^1$ and $A^2$ values may be unsubstituted phenylene or substituted derivatives thereof, illustrative substituents being alkyl, alkenyl, halo, nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical, with isopropylidene being preferred. Also included, however, are unsaturated radicals and radicals which contain atoms other than carbon and hydrogen.

Particularly preferred for use according to the invention are cyclic polycarbonate oligomer mixtures, typically having degrees of polymerization from 2 to about 20 and especially from about 2 to about 12. Such oligomer mixtures may be prepared by art-recognized methods, typically by the cyclization of a bishaloformate of a bisphenol of the formula HO—$A^1$—Y—$A^2$—OH by contact with at least one oleophilic aliphatic or heterocyclic tertiary amine, preferably triethylamine, and an aqueous alkali or alkaline earth metal hydroxide or carbonate solution, preferably sodium hydroxide, under effectively low concentration conditions in a substantially non-polar organic liquid which forms a two-phase system with water, most often methylene chloride. Reference is made to the aforementioned U.S. Pat. No. 4,740,583 for details of the preparation of cyclic polycarbonate oligomer mixtures.

As pointed out in U.S. Pat. No. 4,814,428, also incorporated by reference herein, cyclic polycarbonate oligomers sometimes undergo autopolymerization at temperatures above about 250° C. Such autopolymerization can be suppressed by treating the oligomers with hydrogen halide, preferably in gaseous form. When used herein, the term "acid-polished" designates cyclic polycarbonates which have been stabilized by treatment with hydrogen chloride gas as described in said patent.

Also employed in the method of this invention is at least one cyclic polyester oligomer. They are also macrocyclic compounds and typically comprise structural units of the formula

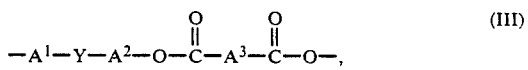  (III)

wherein $A^1$, $A^2$ and Y are as previously defined (but need not be identical to the corresponding groups in the cyclic polycarbonate) and $A^3$ is a divalent aliphatic or m- or p-linked monocyclic aromatic or alicyclic radical, preferably m- or p-phenylene. Such cyclic polyester oligomers are disclosed, for example, in U.S. Pat. No. 4,757,132, the disclosure of which is also incorporated by reference herein.

The cyclic polyester oligomers are also generally employed in the form of mixtures, the constituents of said mixture most often having degrees of polymerization up to about 9. Such mixtures may be prepared by contacting a di-(alkali metal) salt of a bisphenol, as previously defined with reference to cyclic polycarbonate oligomers, with a dicarboxylic acid chloride of the formula

  (IV)

wherein $A^3$ is as previously defined, under conditions of low concentration in a reaction medium comprising a substantially non-polar organic liquid, most often methylene chloride. Reaction temperatures in the range of about 25°–100° C. are typical, and a tertiary amine or quaternary ammonium salt is employed as a phase transfer catalyst.

According to the present invention, the cyclic polycarbonate and polyester oligomers are contacted with a cyclic polycarbonate polymerization catalyst. Such catalysts include various bases and Lewis acids. Basic catalysts are exemplified by lithium phenate, lithium salts of hydroxy-terminated polycarbonates, lithium 2,2,2-trifluoroethoxide, n-butyllithium and tetramethylammonium hydroxide. Also useful are various weakly basic salts such as sodium benzoate, lithium stearat and sodium salts of unsubstituted and substituted phenylacetic acids.

A particularly useful class of Lewis bases is disclosed in U.S. Pat. No. 4,605,731, the disclosure of which is incorporated by reference herein. It comprises numerous tetraarylborate salts, including lithium tetraphenylborate, sodium tetraphenylborate, sodium bis(2,2'-biphenylene)borate, potassium tetraphenylborate, tetramethylammonium tetraphenylborate, tetra-n-butylammonium tetrraphenylborate, tetramethylphosphonium tetraphenylborate, tetra-n-butylphosphonium tetraphenylborate and tetraphenylphosphonium tetraphenylborate. The preferred catalysts within this class are the tetra-n-alkylammonium and tetra-n-alkylphosphonium tetraphenylborates. Tetramethylammonium tetraphenylborate is particularly preferred because of its high activity, relatively low cost and ease of preparation from tetramethylammonium hydroxide and an alkali metal tetraphenylborate.

Other Lewis acids useful as polycarbonate formation catalysts include dioctyltin oxide; titanates such as triethanolaminetitanium isopropoxide and tetra(2-ethylhexyl) titanate; polyvalent metal chelates such as bisisopropoxytitanium bisacetylacetonate (commercially available under the trade name "Tyzor AA"), the bisisopropoxyaluminum salt of ethyl acetoacetate and various transition metal acetylacetonates; and unsubstituted and substituted phenylacetic acids.

The method of this invention is typically conducted by simply contacting the mixture of cyclic polycarbonate and cyclic polyester oligomers with the catalyst at temperatures in the range of about 300°–375° C. and preferably at least about 340° C. Although the use of a solvent is permissible, it is generally not preferred. The amount of catalyst used is an effective amount for polymerization, and is otherwise not critical; in general, about 0.1–2.0%, by weight of cyclic polycarbonate and polyester oligomers, is adequate.

The method of this invention is illustrated by the following examples.

EXAMPLE 1

The cyclic polycarbonate employed was an acid-polished mixture of bisphenol A polycarbonate oligomers having degrees of polymerization principally from 2 to about 2.

The cyclic polyarylate was a mixture of oligomers prepared by the reaction of bisphenol A disodium salt with isophthaloyl chloride in a heterogeneous methylene chloride-water mixture. When the reaction was complete, the methylene chloride phase was washed with aqueous hydrochloric acid solution and the product, including linear polyester, was precipitated by addition to boiling water. Upon extraction of the precipitate with methylene chloride, all of the cyclic oligomers up to a degree of polymerization of about 9 redissolved, to the exclusion of higher oligomers and linear polyester. They were reprecipitated and extracted thoroughly with methanol to remove any remaining phase transfer catalyst.

Cyclic polycarbonate-polyarylate solutions in methylene chloride were prepared and various proportions of tetra-n-butylammonium tetraphenylborate were added, after which the methylene chloride was removed under reduced pressure. The mixtures were dried in a vacuum oven for 4 hours and heated at various temperatures and for various time periods. The results are given in Table I. Molecular weights were determined by gel permeation chromatography.

TABLE I

| Wt. ratio, polyarylate/polycarbonate | Wt. % catalyst | Temperature °C. | Time, min. | Mn ×10⁻³ | Mw ×10⁻³ | Tg, °C. |
|---|---|---|---|---|---|---|
| 1:1 | 0.5 | 300 | 15 | 73 | 274 | — |
| 1:1 | 0.5 | 300 | 45 | 75 | 264 | — |
| 1:1 | 0.5 | 350 | 25 | 63 | — | — |
| 1:1 | 1.2 | 350 | 15 | 30 | 123 | 170 |
| 1:1 | 1.2 | 350 | 30 | 25 | 108 | — |
| 1:3 | 0.5 | 300 | 15 | 64 | 286 | — |
| 1:3 | 0.5 | 300 | 45 | 57 | 252 | — |
| 1:3 | 1.2 | 350 | 15 | 39 | 333 | 167 |
| 1:3 | 1.2 | 350 | 30 | 61 | 354 | — |
| 3:2 | 0.5 | 300 | 15 | 64 | 179 | — |
| 3:2 | 0.5 | 300 | 45 | 68 | 198 | — |
| 3:2 | 1.2 | 350 | 15 | 30 | — | 177 |

EXAMPLE 2

Following the procedure of Example 1, copolyestercarbonates were prepared by the reaction of cyclic polycarbonates with cyclic polyarylates in the presence of 2-ethylhexyl titanate as a catalyst. The catalyst was employed in the amount of 0.4% by weight, and the temperatures was 300° C. The results are given in Table II.

TABLE II

| Wt. ratio, poly/polycarbonate | Time, min. | Mn ×10⁻³ | Mw ×10⁻³ | Tg, °C. |
|---|---|---|---|---|
| 1:1 | 5 | 9.3 | 59 | — |
| 1:1 | 10 | 12.5 | 52 | — |
| 1:1 | 20 | 18.1 | 66 | 159 |
| 1:3 | 5 | 29.5 | 71.7 | — |
| 1:3 | 10 | 22 | 71.3 | — |
| 1:3 | 20 | 24 | 77 | 152 |
| 3:1 | 5 | 19 | 60 | — |
| 3:1 | 10 | 21 | 66 | — |
| 3:1 | 20 | 10 | 68 | 186 |

What is claimed is:

1. A method for preparing a copolyestercarbonate which comprises contacting at least one cyclic polycarbonate oligomer with at least one cyclic polyester oligomer in the presence of a cyclic polycarbonate polymerization catalyst, at a temperature in the range of about 300°–375° C.

2. A method according to claim 1 which comprises contacting a mixture of cyclic polycarbonate oligomers with said cyclic polyester oligomer and polymerization catalyst.

3. A method according to claim 2 wherein the cyclic polycarbonate oligomers are macrocyclic compounds comprising structural units of the formula

aliphatic or heterocyclic tertiary amine, preferably triethylamine,
wherein $R^1$ is a divalent aromatic radical.

4. A method according to claim 3 wherein $R^1$ has the formula

wherein each of $A^1$ and $A^2$ is a monocyclic divalent aromatic radical and Y is a bridging radical in which one or two atoms separate $A^1$ from $A^2$.

5. A method according to claim 4 wherein the cyclic polycarbonate oligomer mixture comprises cyclic bisphenol A polycarbonates.

6. A method according to claim 5 wherein the cyclic polycarbonate oligomers have degrees of polymerization principally from 2 to about 12.

7. A method according to claim 1 wherein a mixture of cyclic polyester oligomers is contacted.

8. A method according to claim 7 wherein the cyclic polyester oligomers are macrocyclic compounds comprising structural units of the formula

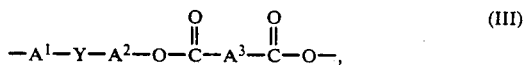

each of $A^1$ and $A^2$ is a monocyclic divalent aromatic radical, Y is a bridging radical in which one or two atoms separate $A^1$ from $A^2$ and $A^3$ is a divalent aliphatic or m- or p-linked monocyclic aromatic or alicyclic radical.

9. A method according to claim 8 wherein the cyclic polyester oligomers are bisphenol A isophthalate or terephthalate oligomers.

10. A method according to claim 9 wherein the cyclic polyester oligomers have degrees of polymerization up to about 9.

11. A method according to claim 10 wherein a mixture of bisphenol A cyclic polycarbonate oligomers having degrees of polymerization from 2 to about 12 is contracted.

12. A method according to claim 11 wherein the cyclic polyester oligomers are bisphenol A isophthalate oligomers.

13. A method according to claim 1 wherein the polymerization catalyst is a base or Lewis acid.

14. A method according to claim 13 wherein the catalyst is a titanate or a tetraarylborate salt.

15. A method according to claim 14 wherein the catalyst is tetra-n-butylammonium tetraphenylborate.

16. A method according to claim 15 which comprises contacting a bisphenol A cyclic polycarbonate oligomer mixture and a bisphenol A isophthalate or terephthalate mixture with said polymerization catalyst.

17. A method according to claim 16 wherein the cyclic polyester oligomers are bisphenol A isophthalate oligomers.

* * * * *